United States Patent [19]

Marceau et al.

[11] Patent Number: 4,855,552

[45] Date of Patent: Aug. 8, 1989

[54] FLUID HEATING DEVICE INCORPORATING TRANSFORMER SECONDARY WINDING HAVING A SINGLE ELECTRICAL TURN AND COOLING MEANS OPTIMIZED FOR HEAT TRANSFER

[75] Inventors: Richard J. Marceau, Montreal; Guy Jeanson, Otterburn Park, both of Canada

[73] Assignee: Hydro-Quebec, Quebec, Canada

[21] Appl. No.: 214,816

[22] Filed: Jul. 1, 1988

Related U.S. Application Data

[63] Continuation of Ser. No. 16,137, Feb. 18, 1987, abandoned.

[51] Int. Cl.[4] .............................................. H05B 6/10
[52] U.S. Cl. ........................... 219/10.51; 219/10.65; 219/10.75; 219/10.79; 219/10.491
[58] Field of Search ............. 219/10.51, 10.491, 10.65, 219/10.77, 10.75, 10.79

[56] References Cited

U.S. PATENT DOCUMENTS

| | | | |
|---|---|---|---|
| 1,577,276 | 3/1926 | Whitten | 219/10.51 |
| 1,656,518 | 1/1928 | Hammers | 219/10.51 |
| 2,407,562 | 9/1946 | Lofgren | 219/10.51 |
| 2,644,881 | 7/1953 | Schörg | 219/10.51 |
| 3,046,378 | 7/1962 | Holz | 219/10.51 |
| 3,171,009 | 2/1965 | Scheller et al. | 219/10.55 R |
| 3,517,151 | 6/1970 | Mekjean | 219/10.51 X |
| 3,936,625 | 2/1976 | Burnett | 219/10.51 |
| 4,341,936 | 7/1982 | Virgin | 219/10.51 |
| 4,560,849 | 12/1985 | Migliori et al. | 219/10.51 |
| 4,602,140 | 7/1986 | Sobolewski | 219/10.51 |

FOREIGN PATENT DOCUMENTS

| | | | |
|---|---|---|---|
| 2578135 | 8/1986 | France . | |
| 216899 | 7/1942 | Switzerland | 219/10.51 |

*Primary Examiner*—Philip H. Leung
*Attorney, Agent, or Firm*—Oblon, Spivak, McClelland, Maier & Neustadt

[57] ABSTRACT

A fluid heating device which comprises a non-conductive magnetic core having a primary winding of an electrically conductive wire. A secondary electrically conductive jacket surrounds or is concentric with the primary winding in close contact therewith through a thermally conductive and electrically non-conductive medium. The primary winding has an input connection connectible to a voltage supply source. A power control device is connected to the input connection. The secondary electrically conductive jacket has passages therein for the flow of a fluid, at predetermined flow rate, from an input to an output of the passages. The fluid extracts heat from the secondary conductive jacket, generated by joule effect, whereby to heat the fluid and simultaneously cool the jacket to maintain the secondary electrically conductive jacket at a substantially constant temperature.

16 Claims, 6 Drawing Sheets

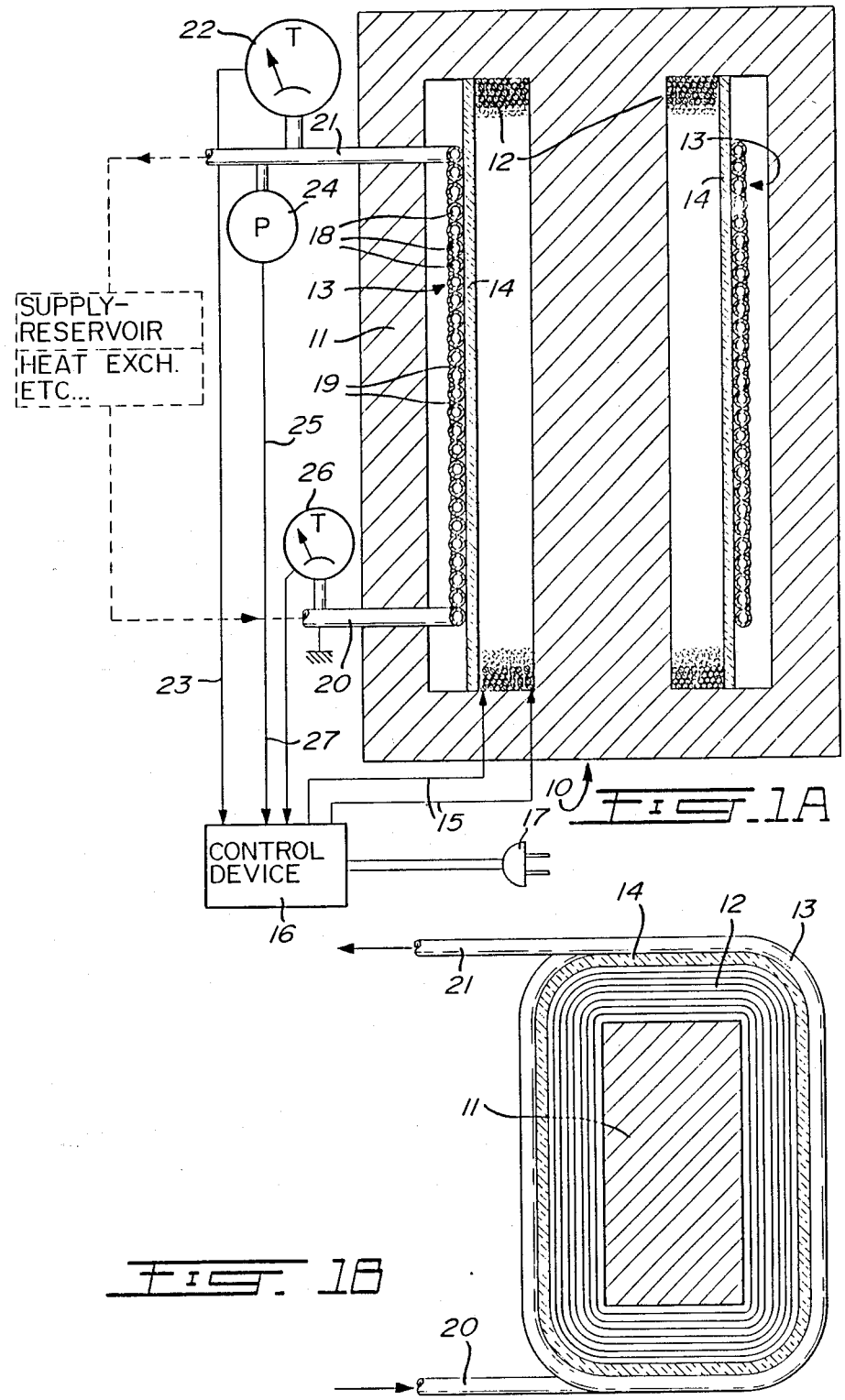

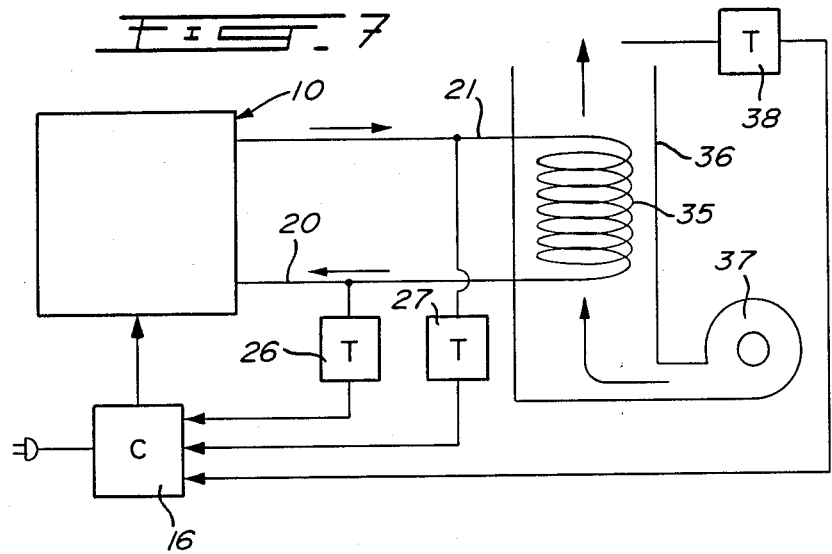
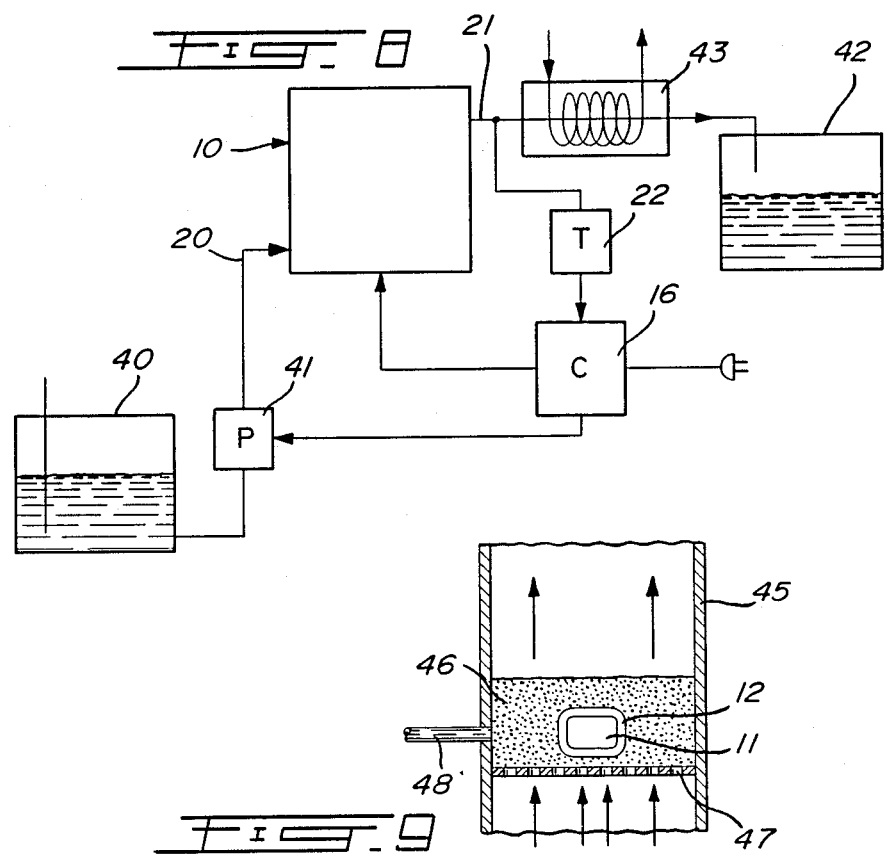

FLUID HEATING DEVICE INCORPORATING TRANSFORMER SECONDARY WINDING HAVING A SINGLE ELECTRICAL TURN AND COOLING MEANS OPTIMIZED FOR HEAT TRANSFER

This application is a Continuation of application Ser. No. 07/016,137, filed on Feb. 18, 1987, now abandoned.

BACKGROUND OF INVENTION

1. Field of Invention

The present invention relates to a fluid heating device and wherein the fluid is heated by electromagnetic induction, and more specifically wherein a fluid passes through a secondary electrically conductive jacket which surrounds the primary or vice versa and wherein the temperature of the fluid is controllable to maintain a substantially constant output fluid temperature as well as maintaining the conductive jacket at a substantially constant temperature.

2. Description of Prior Art

There is known an apparatus to produce heat by using a thermo-inductive generator and wherein a plurality of tubular windings are disposed about the secondary whereby to regulate the temperature of the fluid. Each of the individual tubular windings is short-circuited. A thyristor valve is also associated with individual windings whereby one or more windings in the flow path of the liquid may be activated thereby controlling the temperature thereof within certain tolerances which are not very accurate. Accordingly, by appropriate control of the thyristors, certain portions of the secondary winding can be cut off. Such a three-phase system is briefly described in an article published by Compagnie Generale de Chauffe in 1985. A disadvantage of the above-described thermo-inductive heat generator is that it is bulky, consumes a large quantity of energy, is used only for large industrial applications such as the production of steam. It is also pointed out that such heat generating transformers have many advantages in that they require very little servicing, do not pollute, may be controlled automatically, and could quickly produce heat. They are also simple to install and have a high thermal efficiency. They also have an excellent power factor at full power in having a multitude of applications.

SUMMARY OF INVENTION

It is a feature of the present invention to provide an improved fluid heating device wherein the heat is produced in the secondary of a transformer.

It is another feature of the present invention to provide an improved fluid heating device wherein the heat is produced in the secondary of a transformer and wherein fine temperature control of the medium being heated is achieved by controlling the input voltage on the primary winding.

Another feature of the present invention is to provide an improved fluid heating device wherein heat is generated in the secondary winding, and wherein the secondary winding is a solid medium having passage means therein for the passage of a fluid, and wherein the fluid may be a gas or a liquid.

Another feature of the present invention is to provide an improved fluid heating device wherein heat is generated in the secondary of a transformer and wherein the device has a fine temperature control whereby to produce pasteurized milk, cream, honey, fruit juices and other liquids.

Another feature of the present invention is to provide an improved fluid heating device wherein heat is generated in the secondary of the transformer and wherein the device has a very rapid start-up time to a steady temperature which can be in the order of seconds to several minutes.

Another feature of the present invention is to provide an improved fluid heating device wherein heat is generated in the secondary of a transformer and wherein the transformer has an excellent power factor at all load levels, and wherein the power factor is in excess of 90%.

Another feature of the present invention is to provide a fluid heating device utilizing the secondary of a transformer as a source of heat, and wherein the secondary is at ground potential thereby providing a device which is safe to use, and wherein the secondary and the primary are thermally coupled through a thermally conductive and electrically non-conductive medium.

Another feature of the present invention is to provide an improved fluid heating device which uses the secondary of a transformer as a source of heat and wherein, in a steady state of operation, the heat of the primary is also recuperated by the fluid in order to achieve an efficiency of approximately 100%.

Another feature of the present invention is to provide an improved fluid heating device which utilizes the secondary winding of a transformer as a source of heat and which has a multitude of uses for heating a liquid or a gas, or for evaporating liquids.

According to the above features, from a broad aspect, the present invention provides a fluid heating device comprising a non-conductive magnetive core having a primary winding of electrically conductive wire. A secondary electrically conductive jacket surrounds or is concentric with the primary winding in close contact therewith through a thermally conductive and electrically non-conductive medium. The primary winding has an input connection connectible to a voltage supply source. A power control device is connected to the input connection. The secondary electrically conductive jacket has passage means for the flow of a fluid therein at a predetermined flow rate from an input to an output of the passage. The fluid extracts heat from the secondary conductive jacket, and generated by joule effect, whereby to heat the fluid and simultaneously cool the jacket to maintain the secondary electrically conductive jacket at a substantially constant temperature.

DESCRIPTION OF PREFERRED EMBODIMENTS

Examples of the preferred embodiment of the present invention will now be described with reference to the accompanying drawings, in which:

FIG. 1A is a schematic representation of the construction of the improved fluid heating device of the present invention utilizing a single-phase transformer;

FIG. 1B is a top view of the core and windings of the transformer of FIG. 1A;

FIGS. 7 and 8 are block diagrams showing examples of some applications of the improved fluid heating transformer of the present invention; and FIG. 9 is a schematic section view of a fluidized bed column application of the present invention.

DESCRIPTION OF PREFERRED EMBODIMENTS

Figure 2A:
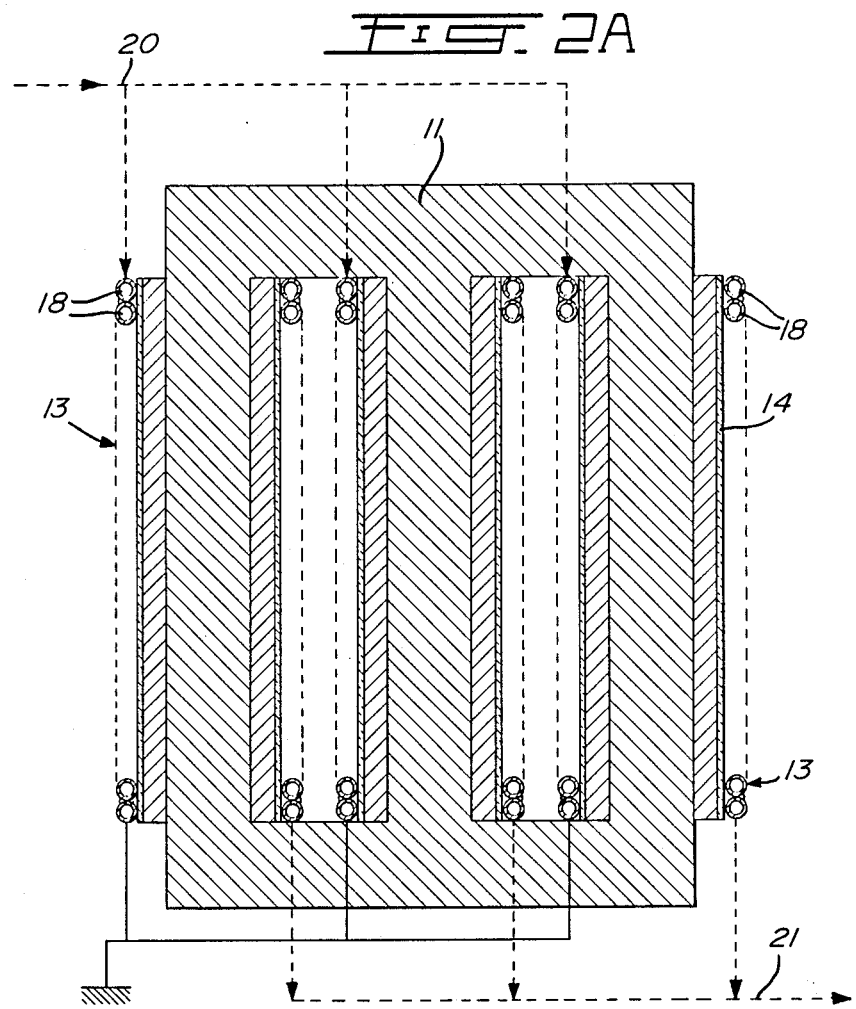
FIG. 2A is a schematic representation of the fluid heating device of the present invention utilizing a three-phase system.

Referring now to the drawings, and more particularly to FIG. 1, there is shown generally at 10 the improved fluid heating device of the present invention. The device comprises essentially a non-conductive magnetic core 11 having a primary winding 12 and a secondary electrically conductive jacket 13 surrounding the primary winding 12. The secondary conductive jacket 13 is disposed on a thermally conductive and electrically non-conductive insulation medium 14 which is usually disposed about the primary winding 12. This insulation medium may be a wrapping of fiberglass electrical insulation or could be alumina powder, or other suitable medium having the above-noted characteristics of being a good thermal conductor while being electrically non-conductive.

The primary winding 12 has input connections 15 which are connected to a control device 16 which can control the power fed to the primary winding thereby controlling the amount of heat generated in the secondary medium 13. The control device has an input connection 17 to couple same to a voltage supply source such as the standard 115-volt or 220-volt 60-cycle AC source.

As herein shown, the secondary jacket 13 is constituted by a coil formed of a plurality of windings 18 of a metallic conduit such as copper, stainless steel, bronze, etc., which are short-circuited to one another by weld spots 19 to form a unitary mass. Because the secondary may be grounded, the construction of the transformer is very safe even when used at a high power level or with flammable fluids. One end of the coil constitutes an input 20 to the passage while the opposite end 21 constitutes the output. The fluid is introduced at the input 20, flows around the coil windings 18 and exits at the outlet 21 where it has been heated to a desired temperature. By controlling the input voltage by means of a control device 16, the temperature of the fluid passing through the coil can be precisely regulated. The control device 16 may be a thyristor power control device or a variable AC voltage source. The control device may also have automatic control circuitry, obvious to a person skilled in the art, whereby to regulate the fluid temperature. In order to achieve this regulation a temperature sensing device 22 may be connected to the outlet tube 21 and feed back a signal through a connection 23 to the control device. The pressure of the fluid within the coil may also be sensed by a pressure sensing device 24, also connected to the outlet tube 21, and connected to the control device via connection 25 to provide a signal representative of the pressure in the fluid. A further temperature sensing device 26 may also be connected to the input tube 20 and the control device via connection 27 to also provide a signal indicative of the input temperature of the fluid. All these control signals may be processed by the control device to assure the proper operation of the fluid heater 10. The fluid in the output conduit 21 may be utilized for various applications and could supply a load which may be a heat exchanger, a reservoir, etc.

Figure 2B:
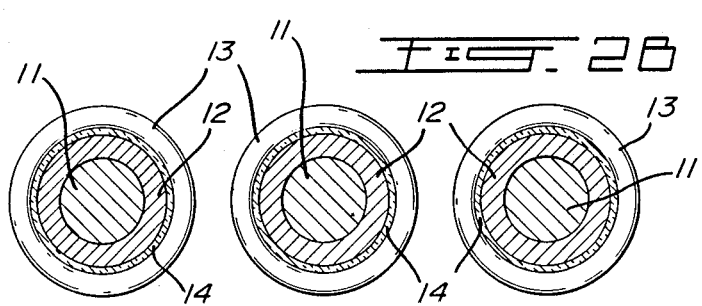
FIG. 2B is a top view of the core and its windings of each phase.

Referring now to FIGS. 2A and 2B, there is shown a similar construction but in a three-phase application. As herein shown, each of the phase has a secondary coil insulated from the primary whereby to provide three different heat sources. It is also conceivable that the fluid output of each of the coils may be connected in series through appropriate means whereby high heat may be produced with the use of a very low input power supply. The construction of this three-phase system is self-explanatory from the drawings and from the description of FIGS. 1A and 1B.

Figure 3:
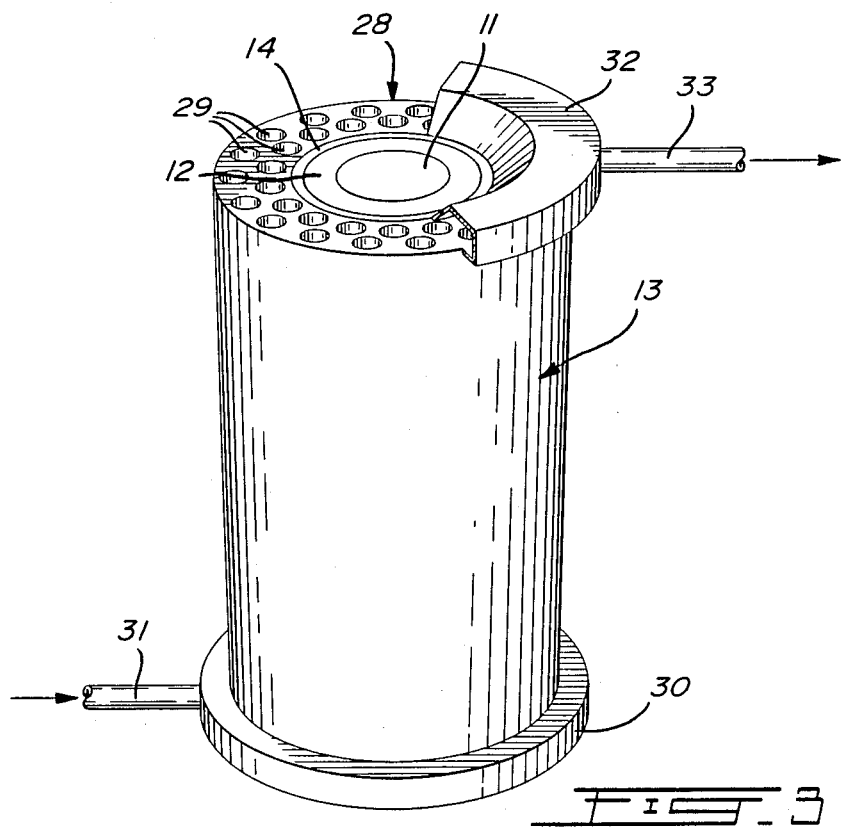
FIG. 3 is a schematic perspective view showing a modification of the construction of the secondary electrically conductive jacket of the transformer.
Figure 4:
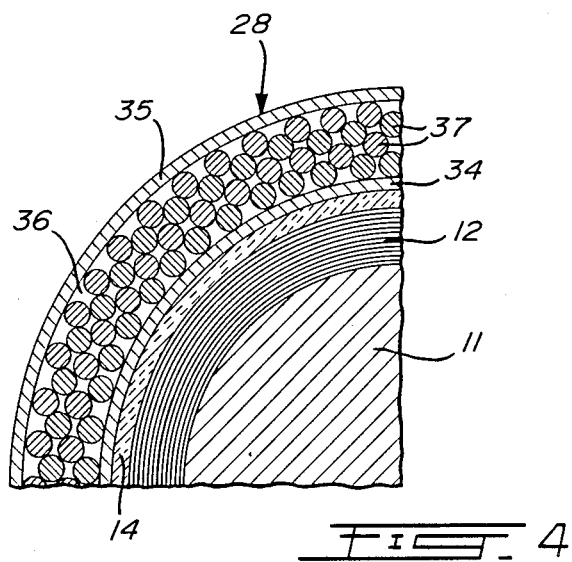
FIG. 4 is a simplified section view showing another construction of the secondary electrically conductive jacket.

Referring now to FIGS. 3 and 4, there are shown other alternative constructions of the secondary electrically conductive jacket. As shown in FIG. 3, the secondary electrically conductive jacket is constituted by a metal cylinder 28 having a porous core defined by a plurality of spaced apart axial bores 29 extending across opposed ends of the cylinder 28. A header chamber 30 is provided at the inlet end pipe connection 31 and an outlet header 32 is provided at the outlet tubular end 33 whereby water is caused to flow through the porous cylinder 8 to cool the cylinder and heat the fluid.

As shown in FIG. 4, the porous cylinder 28 may also be constituted by a a hollow cylinder having spaced apart concentric inner and outer walls 34 and 35 respectively. In the space 36 defined between these walls 34 and 35 is disposed a plurality of elongated metal rods 37 which are closely spaced in contact relationship between the inner and outer walls to define interstitial spaces therebetween thereby constituting a porous mass. The induced currents will flow through these rods and generate heat which is picked up by the fluid passing in between the rods. It is further conceived that the porous core may be comprised of an appropriate packed metal powder. In all applications, the fluid may be a liquid or a gas, and specific applications of this transformer will be described later with reference to FIGS. 7 and 8. Also, in all applications, the position of the primary and secondary can be reversed so that the primary totally envelops the secondary.

A specific electromagnetic induction fluid heater was constructed with a transformer having a standard core and primary winding. The primary winding was composed of four concentric windings of six AWG wire having a polyester covering about the central shaft of the core for a total of 240 primary turns (60 turns per layer). Each layer was insulated from one another by a Nomex (registered trademark) sheet of 0.005 inch, and the entire winding structure was soaked and baked in a varnish having good thermal resistance (Schenectady 346). This construction permitted the primary winding to operation up to a temperature of about 180° C.

The dimension of the core was selected as a function of a specific winding voltage having approximately 12.4 millivolts per winding per centimeter square, and of a voltage of 1 volt per winding.

The secondary was constructed from a bronze conduit having an exterior diameter of 0.405 inch and a wall thickness of 0.062 inch. The length of the conduit was 11.5 meters wound on a coil having 20 turns and short-circuited across its length. The short-circuit was effected by soldering all of the windings with silver along the entire length of the conduit. Approximately 1 kilogram of alumina ceramic powder was disposed in the space between the primary and secondary windings, and tests were conducted with the alumina insulation and without the alumina insulation. The tests were also made with water as the fluid conducted through the secondary jacket or winding.

When the fluid reached a steady state the following measurements were made at different fluid flow rates and at different input voltages to the primary. The current, the voltage, and the power factor were measured as well as the electrical power. The flow rate and the temperature of the water at the inlet and outlet of the secondary were also measured, as well as the pressure of the water at both the inlet and outlet. The distribution of the temperature in the secondary winding was also measured, as well as the temperature of the primary at different locations. All of the temperature measurements were effected by thermo-couples which were soldered at different measuring points on the secondary conduit.

Figure 5:
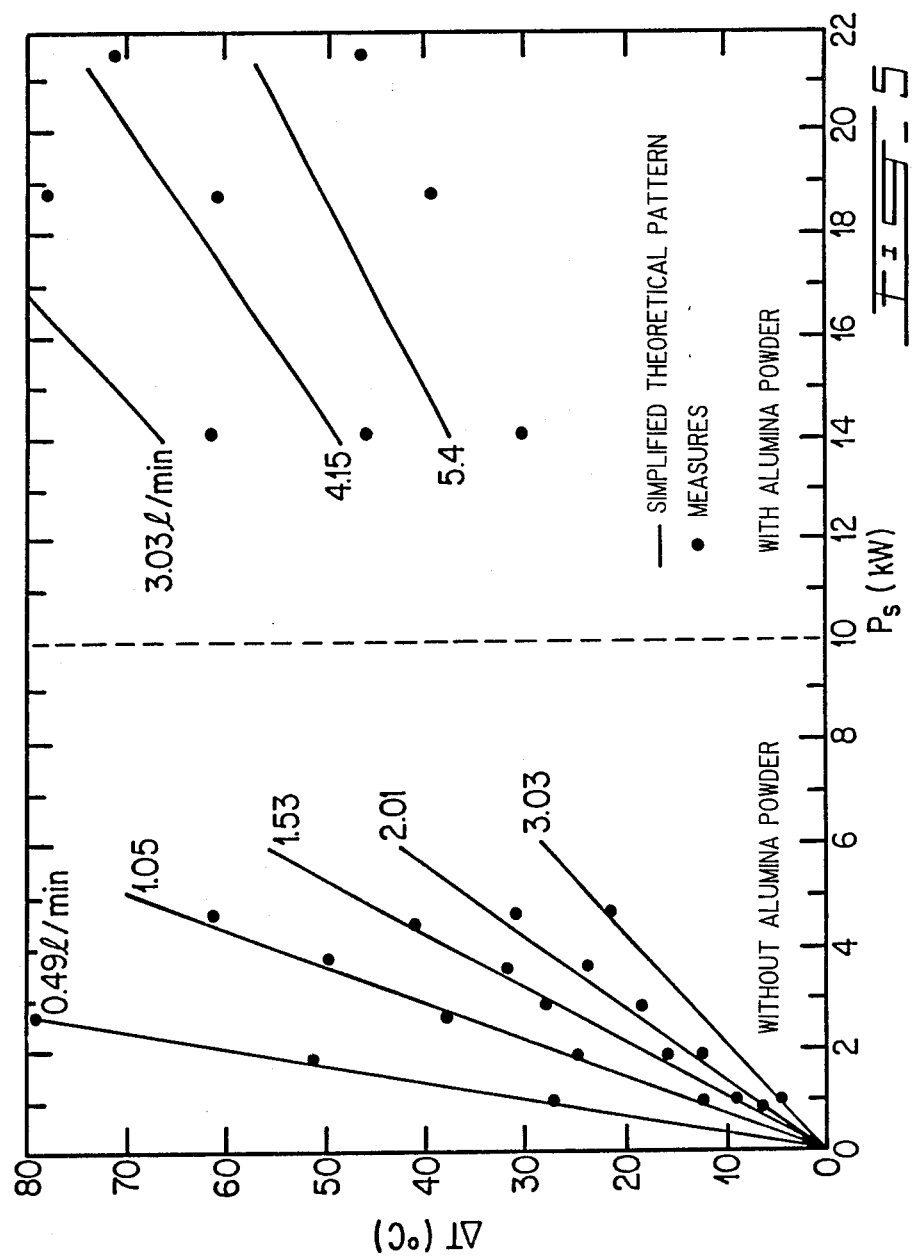
FIG. 5 are characteristic curves showing the temperature performance of the secondary winding with and without alumina powder between the primary and secondary.
Figure 6:
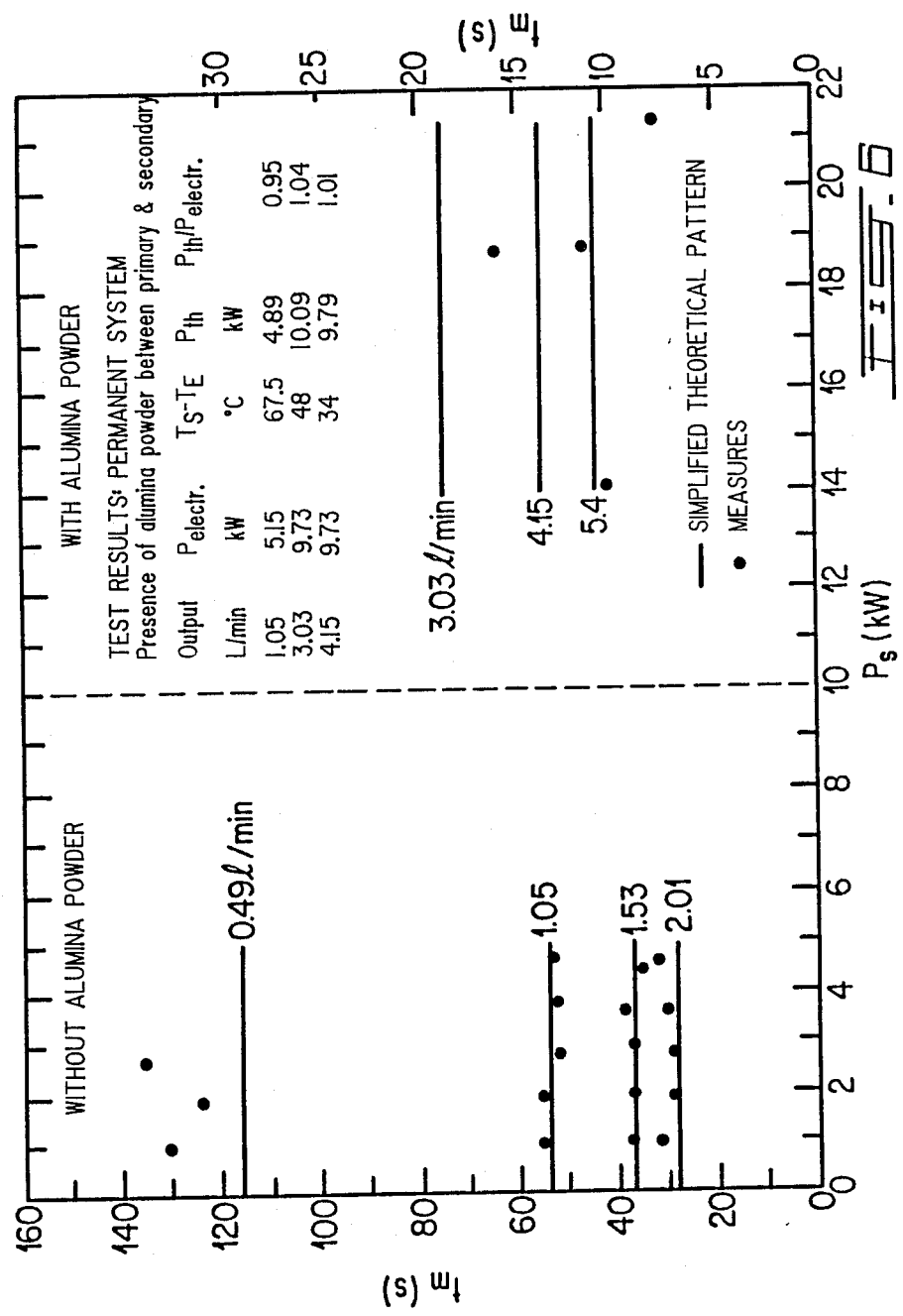
FIG. 6 are comparative characteristic curves, associated with the temperature rise values of FIG. 5, illustrating the heating time of specific quantities of liquid passing through the secondary jacket.

Referring now to FIGS. 5 and 6, there is shown the results achieved by these tests on the abovementioned specific fluid heating transformer. Shown in FIG. 6 is the temperature rise time, i.e., the time required for the device to achieve 90% of a fixed value of temperature rise identified in FIG. 5. These rise times were measured with various flow rates. FIGS. 5 and 6 show measurements effected with and without the use of the ceramic alumina powder between the primary and secondary. In both of these two cases the tests were made with the fluid entering the secondary at a temperature of approximately 5° to 7° C., and with the secondary and alumina powder being at approximately the same temperature.

The electromagnetic efficiency of the fluid heating device of the present invention is characterized by two efficiency values, namely the inherent efficiency of the secondary winding measured at the end of the initial heating cycle, which is herein considered as the stationary state, and by the efficiency of the entire transformer assembly in its steady state of operation, that is, after heat generated by the primary has diffused to the secondary for it to be evacuated by the fluid. With or without the alumina powder between the primary and secondary, the power dissipated by the primary during the initial rise to a quasi-static or stationary state cannot influence the value of the temperature of the liquid in the secondary as the thermal diffusion time between the primary and the secondary is much longer than the temperature rise time of the secondary. In both cases, the efficiency of the secondary is calculated in essentially the same manner, i.e., by comparing the heat evacuated by the fluid, herein represented by $P_{th}$, to the appropriate electrical input power. Firstly, the thermal power evacuated by the fluid is calculated by the following equation:

$$P_{th} = q_c C_{pe} (T_S - T_E) \quad (1)$$

The secondary power is thereafter calculated from the total resistance that is measured indirectly at each test, and to which the resistive value of the primary is subtracted, which is known at 20° C. and corrected for the average temperature measured at each test. Because we measure the intensity of the current in the primary and can estimate the resistance of the secondary reflected to the primary, we can calculate the dissipated power by the secondary by the following equation:

$$P_s = I^2 R_2 \quad (2)$$

The efficiency of the secondary winding at the end of the initial temperature rise to a quasi-static or stationary state has therefore a relationship to $P_{th}$ and $P_s$ and can be expressed by the following equation:

$$n_s = P_{th}/P_s \quad (3)$$

For steady state efficiency, measurements were made after 3 hours of operation although a permanent steady state is usually achieved in less than 1.5 hours. The thermal power, $P_{th}$, is calculated as above whereas the electrical power is that measured at the input of the primary. Such results are illustrated in the Table of FIG. 6. This illustration also shows the measured rise times with and without the alumina ceramic powder. In the absence of the alumina ceramic powder between the primary and secondary, the power was limited to 5 kilowatts. After the introduction of the powder between the primary and secondary this value reached 10 kilowatts. This is due to the rating of the electrical insulation which does not withstand a temperature rise above 180° C.

With an input voltage of 155 volts on the primary, a power level of 9.73 kilowatts was measured. The power factor is 91.5% and the maximum temperature on the primary was 164° C. The average temperature of the primary is about 120° C., and the estimated electric loss in the primary at this temperature is about 834 watts. At a supply voltage of 238 volts on the primary, we recorded a power level of 23 kilowatts, at an identical power factor, and the loss in the primary winding was evaluated at 1.54 kilowatts at a primary temperature of 50° C. The curves of FIGS. 5 and 6 demonstrate the performance of the apparatus under different operating conditions. Additional measurements also indicate that the temperature of the secondary winding and the water flowing therein are everywhere approximately identical in steady state, thus permitting close control of fluid temperature. Also, the Table of FIG. 6 shows that the efficiency of the device is approximately 100%. In the absence of the alumina powder, the efficiency of the bare secondary entering into the stationary state is 97%. In the presence of alumina it is noted that this value decreases to 88%. This signifies that the secondary and primary heat the alumna powder from their respective sides until a steady state equilibrium is reached. It is at that time that the liquid recuperates the thermal energy generated by the primary, that is 9% of the total electric power. Finally, we can also discern from the Table of FIG. 6 that the thermal power sometimes seems to surpass the electric power to achieve an efficiency factor which exceeds 100%. This results primarily from an experimental error related to maintaining a constant RMS voltage in steady state due to local voltage regulation problems beyond our control.

Referring now to FIGS. 7, 8 and 9, there is illustrated a few applications of the fluid heating device of the present invention. As shown in FIG. 7 the device 10 is utilized as a heat exchanger wherein the hot side or outlet conduit 21 is connected to a heat exchange coil 35 located in a furnace housing 36 wherein a blower 37 forces air through the heat exchange coil 35 whereby to cool the fluid therein. The output fluid in outlet pipe 21 of the device 10 of the present invention has a temperature sensing element 27. The return fluid in the inlet pipe 20 of the device 10 of the present invention also has a temperature sensing element 26; the air passing through the heat exchange coil 35 also has a temperature sensing element 38. These temperature sensing elements feed a signal to the control device to regulate the liquid temperature. The air passing through the heat exchange coil 35 is heated and distributed in an enclosure (not shown). Alternatively, the entire fluid heating device 10 may be mounted in the chamber 35 with the secondary jacket exposed to the air flow. Still further, the secondary winding may be constructed differently with larger tubes and the air could be forced through these tubes to heat up and then released in a convection conduit system.

FIG. 8 shows another application wherein the fluid heating device 10 of the present invention is utilized as a milk pasteurizer. As herein shown, milk from a reservoir 40 is pumped by means of a pump 41 to the inlet conduit 20 of the secondary winding of the fluid heating device 10. The milk is heated to a precise temperature which is sensed by the control device 16 to regulate this temperature. The outlet conduit 21 then releases the pasteurized milk in a further column 42. A heat exchange device 43 may also be interposed between the column 42 and the outlet conduit 21 of the fluid heating device of the present invention whereby to cool the pasteurized milk and utilize the heat for another application.

Referring now to FIG. 9, there is shown another schematic application wherein the transformer is utilized in a fluidized bed boiler. Generally, the boiler housing 45 would contain the primary winding 12 and core in a section of its column and about this primary winding 12 would be disposed a metal powder 46 which would constitute the secondary medium. A porous support wall 47 would support the powder and would permit a gaseous flow through the secondary powder medium 46. Another substance could be injected into the powder by means of a conduit 48.

Many other applications of the fluid heating device of the present invention are foreseen and, as an example only, it may be used for heating corrosive liquid (acids, electrolytes), and it could heat heavy and thick liquids (paper pulp, etc.), agricultural products (milk, cream, fruit juice, syrups, diluted proteins), pharmaceutical liquids (medical preparations, antibiotics), or inflammable or dangerous liquids such as oil and organic matter. In its evaporation mode, the apparatus may also be utilized for use as a reboiler in a distillation column, or used as a sterilizer, etc.

It is within the ambit of the present invention to cover any obvious modifications of the examples of the preferred embodiment described herein, provided such modifications fall within the scope of the appended claims.

We claim:

1. A fluid heating device comprising a non-conductive magnetic core having a primary winding of electrically conductive wire, a secondary unitary electrically conductive cylinder concentric with said primary winding in close contact therewith through a thermally conductive and electrically non-conductive medium to provide for said conductive cylinder to absorb heat generated by said primary winding when a voltage is applied thereto, said secondary electrically conductive cylinder being a coil formed from a plurality of windings of a metallic conduit positioned in side-by-side contact, said windings being short-circuited along their entire length with one another across said coil, said primary winding having an input connection connectible to a voltage supply source, a variable power control device connected to said input connection, said secondary electrically conductive cylinder having passage means for the flow of a fluid therein at a predetermined flow rate from an input to an output of said passage, said fluid extracting heat from said secondary conductive cylinder and generated by joule effect whereby to heat said fluid and simultaneously cool said cylinder to maintain said secondary electrically conductive cylinder at a substantially constant temperature.

2. A fluid heating device as claimed in claim 1 wherein there is further provided means to control the temperature of said fluid.

3. A fluid heating device as claimed in claim 2 wherein there is further provided temperature sensing means connected to said output of said passage to sense the temperature of said fluid.

4. A fluid heating device as claimed in claim 3 wherein said means to control the temperature of said fluid is constituted by said power control device, said power control device varying said voltage supply source to said input connection of said primary winding as a function of fluid flow and temperature thereby varying the amount of heat generated by said conductive cylinder.

5. A fluid heating device as claimed in claim 4 wherein said power control device is a variable voltage control device.

6. A fluid heating device as claimed in claim 4 wherein said power control device is a variable AC voltage source.

7. A fluid heating device as claimed in claim 4 wherein said power control device is a thyristor power control device.

8. A fluid heating device as claimed in claim 3 wherein said temperature sensing means is a temperature sensing device connected to said output of said passage, said temperature sensing device being connected to said control device and providing a signal representative of the output temperature of said fluid.

9. A fluid heating device as claimed in claim 8 wherein there is further provided a pressure sensing device connected to said output of said passage, said pressure sensing device being connected to said control device and providing a signal representative of the internal pressure of the device.

10. A fluid heating device as claimed in claim 9 wherein said fluid in said output of said passage is superheated steam at a temperature higher than 100° C.

11. A fluid heating device as claimed in claim 8 wherein said fluid in said output of said passage is pasteurized milk.

12. A fluid heating device as claimed in claim 1 wherein said input and output of said passage being constituted by opposed respective ends of said conduit.

13. A fluid heating device as claimed in claim 1 wherein said voltage supply source is a 60-cycle source.

14. A fluid heating device as claimed in claim 1 wherein said fluid is a liquid.

15. A fluid heating device as claimed in claim 1 wherein said fluid is a gas.

16. A fluid heating device as claimed in claim 1 wherein said thermally conductive and electrically nonconductive medium is an insulating material surrounding said primary winding and in contact with said conductive cylinder.

* * * * *